E. WEBER.
EGG AND CREAM BEATER.
APPLICATION FILED APR. 26, 1920.
1,372,578.
Patented Mar. 22, 1921.
2 SHEETS—SHEET 1.
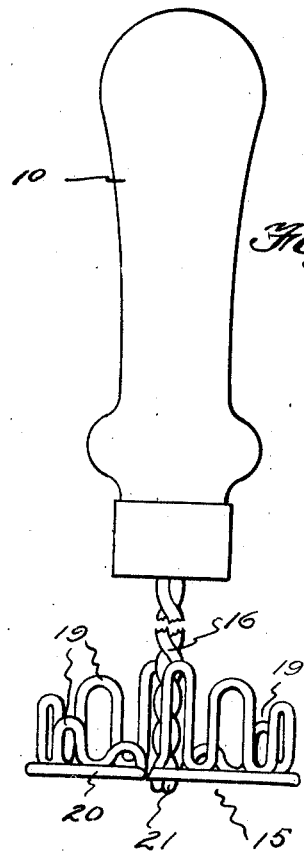
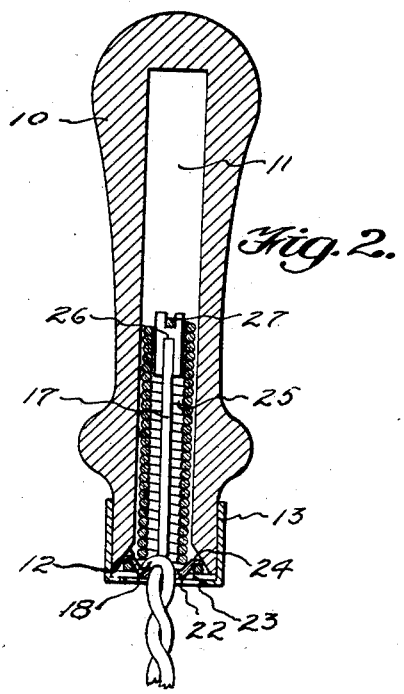
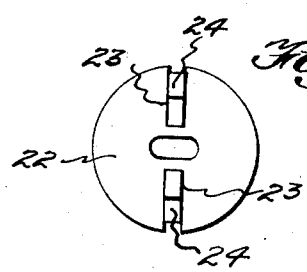
Erwin Weber
INVENTOR
BY Victor J. Evans
ATTORNEY E. WEBER.
EGG AND CREAM BEATER.
APPLICATION FILED APR. 26, 1920.
1,372,578.
Patented Mar. 22, 1921.
2 SHEETS—SHEET 2.
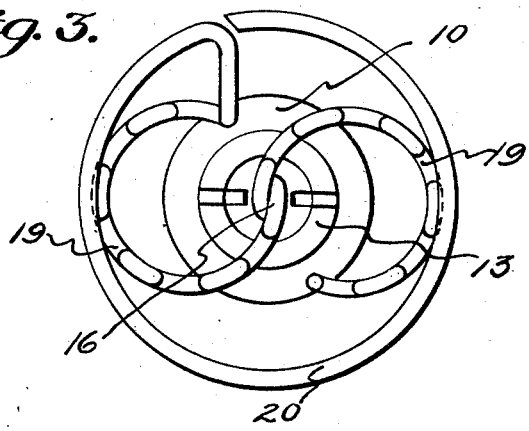
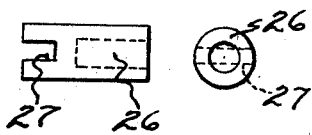
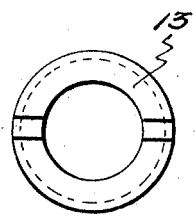
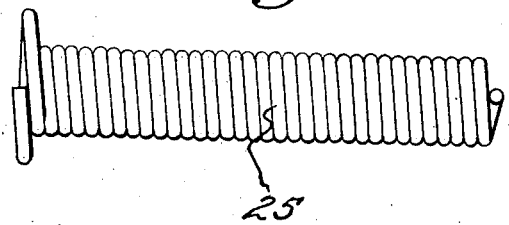
Erwin Weber
INVENTOR
BY Victor J. Evans
ATTORNEY
WITNESS:

UNITED STATES PATENT OFFICE.

ERWIN WEBER, OF MILWAUKEE, WISCONSIN.

EGG AND CREAM BEATER.

1,372,578.     Specification of Letters Patent.     Patented Mar. 22, 1921.

Application filed April 26, 1920. Serial No. 376,723.

*To all whom it may concern:*

Be it known that I, ERWIN WEBER, a citizen of the United States, residing at Milwaukee, in the State of Wisconsin, have invented new and useful Improvements in Egg and Cream Beaters, of which the following is a specification.

This invention relates to kitchen utensils, particularly to egg beaters and the like, and has for its object the provision of a novel form of egg beater which includes a beater proper formed entirely of wire having a portion thereof twisted together to form a shank the equivalent of a screw or spiral groove and further including a reciprocatory handle movable longitudinally of said shank whereby to impart rotary movement to the beater proper.

An important object is the provision of a device of this character which is designed to be manually operated in one direction and spring operated in the opposite direction, the spring being disposed and mounted in a peculiar manner.

Another object is the provision of a device of this character in which the beater proper is formed of wire bent into a circular series of convolutions or bends of progressively different sizes whereby to provide a large number of points at which the beater proper will engage the substance to be beaten.

An additional object is the provision of a device of this character which will be simple and inexpensive in manufacture, rapid in use, easy to operate, durable in service, and a general improvement in the art.

With the above and other objects and advantages in view, the invention consists in the details of construction to be hereinafter more fully described and claimed and illustrated in the accompanying drawings in which—

Figure 1 is a side elevation of my device.

Fig. 2 is a longitudinal sectional view taken at right angles to Fig. 1,

Fig. 3 is an end elevation of the beater proper, and

The remaining figures are detail views.

Referring more particularly to the drawings, the numeral 10 designates a handle formed preferably of wood and provided with a central bore 11, the outer end of which is countersunk, as shown at 12, and provided with a metallic ferrule 13. Adjacent the ferrule the handle is formed with a circumferential enlargement which prevents the handle from slipping out of the operator's grasp.

The beater member is designated broadly by the numeral 15 and is formed from wires which are twisted together, as shown, to form a shank 16 which is disposed within the bore 11 of the handle. One of the wires extends beyond the end of the other, as shown at 17, while the other wire twisted therewith has its end portion adjacent the portion 17 reflexly bent to form a stop, as shown at 18. The twisting of the wires together to define the shank 16 gives this shank the effect of having a spiral groove therein. At one end the wires forming the beater member are bent spirally to form oppositely extending arms 19 and the convolutions in each arm progressively decrease away from the shank 16. One arm 19 has its terminal prolonged and bent to define a ring 20 which extends outwardly of the convolutions in the arms 19. At their junctures with the shank 16, the innermost convolutions of the arms 19 extend outwardly beyond the plane of the lower edges of the other convolutions whereby to form a projection shown at 21, constituting a pivot.

Secured within the recessed end of the handle 11 is a metal washer 22 which is provided centrally with an elongated slot 23 for engagement upon the shank 16 whereby when the handle 11 is depressed the resilient longitudinal movement of the handle 11 upon the shank will result in rotation of the latter.

In order to provide spring means for returning the handle to normal position, I provide the washer 22 with a pair of tongues 24 which are upstruck from the washer. I also make use of a coil spring 25 located within the handle in encircling relation to the end 17 of the shank and having one or more convolutions at one end increased in diameter and engaged beneath the tongues 24. Disposed upon the upper end of the shank portion 17 is a member 26 having a socket engaging upon the shank portion 17 and also having a transverse notch 27 within which is engaged the endmost convolutions at the other end of the spring 25. It will be seen that the tendency of the spring is to draw the member 26 toward the washer 22.

The operation of the device is as follows:

When it is desired to beat eggs or whip cream, the eggs or cream must first be placed within a suitable receptacle such as a bowl of proper size. The operator then grasps the device by means of the handle 10 and places the beater 15 within the receptacle, the projection 21 engaging against the bottom of the receptacle. The operator then presses downwardly upon the handle 10 whereupon, by virtue of the engagement of the slot 23 in the washer 22 with the twisted shank, the shank and consequently the beater will be rotated in one direction. When the operator subsequently relieves the pressure upon the handle, the spring 25 will return the handle to normal position, thereby causing rotation of the beater member in the opposite direction. Owing to the peculiar formation of the beater arms, it will be seen that the substance to be beaten or whipped will be engaged at a great number of points so as to exert a very efficient agitating action which will produce the desired result in the minimum time. It will be observed that the ring 20 prevents slapping of the arms 19 against the receptacle.

From the foregoing description and a study of the drawings it will be apparent that I have thus provided a simply constructed and easily operated egg beater or cream whipper which will efficiently perform its functions, which will be durable, easily kept clean, and a labor saver.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising a handle and a beater member including a shank slidable with respect to and rotated by reciprocatory movement of the handle, said beater member including oppositely extending arms each formed of a plurality of upstanding convolutions arranged transversely of the arms and of progressively increasing heights.

2. A device of the character described comprising a handle and a beater member including a shank slidable with respect to and rotated by reciprocatory movement of the handle, said beater member being formed of wires twisted together to define the shank, one wire having its end portion bent into circular form to define a ring and having its intermediate portion bent into S form and extending across the ring.

3. A device of the character described comprising a handle and a beater member including a shank slidable with respect to and rotated by reciprocatory movement of the handle, said beater member being formed of wires twisted together to define the shank, one wire having its end portion bent into circular form to define a ring and having its intermediate portion bent into S form and extending across the ring, said S shaped portion being formed with a plurality of upstanding convolutions.

4. A device of the character described comprising a handle and a beater member including a shank slidable with respect to and rotated by reciprocatory movement of the handle, said beater member being formed of wires twisted together to define the shank, one wire having its end portion bent into circular form to define a ring and having its intermediate portion bent into S form and extending across the ring, said S shaped portion being formed with a plurality of upstanding convolutions of different heights.

5. A device of the character described comprising a handle and a movable beater member formed of wires twisted together to define a shank engaging the handle and to define a plurality of radial arms each formed as a plurality of convolutions transverse with respect to the arms and progressively decreasing in diameter.

6. A device of the character described comprising a handle and a movable beater member formed of wires twisted together to define a shank engaging the handle and to define a plurality of radial arms each formed as a plurality of convolutions transverse with respect to the arms and progressively decreasing in diameter, the terminal of one arm being prolonged and bent into ring form, and the junctures of the innermost convolutions with the shank defining a projection extending below the other convolutions whereby to serve as a pivot.

In testimony whereof I affix my signature.

ERWIN WEBER.